Feb. 28, 1967

A. G. JAMME 3,306,390

FOUR-WHEEL-DRIVEN-AND-STEERED VEHICLE
WITH WHEEL GAGE ADJUSTING MEANS

Filed June 25, 1963

INVENTOR
Andre Georges Jamme
By
Watson, Cole, Grindle & Watson
ATTORNEYS

United States Patent Office 3,306,390
Patented Feb. 28, 1967

3,306,390
FOUR-WHEEL-DRIVEN-AND-STEERED VEHICLE WITH WHEEL GAGE ADJUSTING MEANS
André Georges Jamme, 28 Rue Laboulaye, Villemomble, France
Filed June 25, 1963, Ser. No. 290,456
Claims priority, application Great Britain, July 2, 1962, 25,319/62
15 Claims. (Cl. 180—46)

This invention relates to vehicles.

According to this invention, there is provided a vehicle comprising a body, a pair of members rotatably mounted on opposite sides of the body about respective horizontal axes, a pair of radial arms respectively mounted on the two members for rotation about upright axes, respective ground-engaging means mounted on the outer ends of the arms, means for adjusting the positions of the arms relative to the body about said upright axes, and differential means interconnecting the members so that swivelling of either of the arms about its horizontal axis relative to the body causes swivelling of the other arm in the opposite direction about its horizontal axis relative to the body.

According to a preferred feature of the invention, a second arm extends generally radially outward in the opposite direction to the first said arm on each of said members and carries ground-engaging means, said second arms being mounted for pivotal movement about respective upright axes on the respective members, and means being provided for adjusting the positions of said second arms about their upright axes relative to the body.

According to another preferred feature of the invention, the differential means comprises a pair of cranks fixed to the respective members, a horizontal shaft mounted parallel to said horizontal axes of the members which shaft carries oppositely-projecting crank arms, and a pair of links interconnecting the two cranks with the respective crank arms.

The invention also provides a vehicle comprising a body, horizontal bridge shafts extending from opposite sides of the body, a side piece mounted at the free end of each bridge shaft for swivelling movement relative to the body about a horizontal axis, a pair of arms carried by each side piece, the arms being pivotable relative to the side pieces about upright axes disposed respectively at opposite sides of the horizontal axis of rotation of the side piece, means for adjusting the positions of the arms relative to the body about said upright axes, differential means interconnecting the side pieces so that swivelling of either side piece about its horizontal axis relative to the body causes swivelling of the other side piece in the opposite direction about its horizontal axis relative to the body, and four steerable ground-engaging wheels carried at the free ends of the respective arms to pivot relative to the arms about steering axes.

The vehicle may be an agricultural tractor, or earth moving or like apparatus as used e.g. in civil engineering or similar apparatus e.g. a locomotive incorporating its own drive source, either equipped or not with special devices to suit the different purposes for which the vehicle is to be used in different industries e.g. public works, mining, maintenance, or adapted for manoeuvring aircraft on the ground, or adapted for road or rail transport or the combination of the two or all other applications. Alternatively the vehicle may be a trailer, wagon or the like which has no independent drive source and which is pulled or pushed by e.g. a locomotive, tractor or the like.

Some embodiments of the invention in the form of an agricultural tractor will now be described by way of example with reference to the accompanying drawings.

Referring now to FIGURES 1 to 7 of the drawings, a tractor of the invention comprises a body 10 containing a diesel engine 11, a diesel fuel tank 12 and hydraulic controls as will hereinafter be described. The body has a rear portion 14 which is not as deep as the remainder of the body. The upper surface of the body 10 has a recess 15 extending partially over the rear portion 14. The base 16 of the recess 15 is shaped to provide a platform and one side of the recess 15 is shaped to provide a seat 17 for a tractor driver. Guard rails 18 surround the recess 15 except for an opening 19 through which the driver may enter the recess 15.

A stout horizontal hollow shaft 23 is journalled in and extends through the rear portion 14 of the body 10. Two bridge shafts 21 are mounted for free rotation on the opposite ends of the shaft 23 about a common axis 22. A side piece 24 is centrally welded to the free end of each bridge shaft 21. The ends of the longer limbs 25 of two hollow tubular generally L-shaped support arms 26 are pivoted to opposite sides of each side piece 24. The longer limbs 25 of the support arms 26 are normally (i.e. when the ground on which the tractor is standing is plane and horizontal) substantially horizontal and the shorter limbs 27 normally substantially vertical. Each shorter limb 27 is constituted by a bearing in which is rotatably received a pivot shaft 28 (see FIGURE 4) pivotable about a normally vertical pivot axis 29 and carrying a ground engaging wheel 31 as will be hereinafter described.

A lug 32 (see FIGURE 6) projects forwardly from each bridge shaft 21 adjacent the body 10. Each lug 32 is connected by a connecting link 33 to a crank arm 34. A rigid shaft 35 passes through the rear portion 14 of the body 10 and is journalled for rotation relative thereto. At its opposite ends the shaft 35 carries for rotation therewith the two crank arms 34 which are located in diametrically opposed positions. Thus if one bridge shaft 21 rotates relative to the body 10 in one direction, the other bridge shaft 21 is caused to rotate an equal amount relative to the body 10 in the opposite direction by the differential linkage comprising parts 32, 33, 34 and 35. The connecting link 33 which projects rearwardly (i.e. the connecting link visible in FIGURE 2) may be eccentrically mounted to give a longer throw of the crank arm before it (link 33) fouls the bridge shaft 21.

A collar 36 is secured to each bridge shaft 21 and has forward and rear pairs of securing eyes 37. One part of an hydraulic jack 38 is pivotally secured to each pair of eyes 37. (One jack 38 is omitted from FIGURE 3 for clarity.) A relatively movable part 39 of the jack 38 is pivotally secured to a pair of lugs 41 projecting inwardly from the longer limb 25 of the adjacent support arm 26. Thus by expanding and contracting the jacks 38 the arms 26 may be pivoted about the side pieces 24. In this way the track width, i.e. the distance between the front and/or rear ground-engaging wheels 31 may be varied. Further each jack 38 is individually operable so that each arm may be separately pivoted as required. The arms may pivot through approximately 30° from a position parallel to the longitudinal plane 42 of the tractor.

Within its interior 43 (see FIGURE 4) the shorter limb 27 of each support arm 26 has near its lower end an integral upwardly tapering projection 44. A collar 45 having an inwardly projecting surface 46 is welded or otherwise secured to the upper part of the shorter limb interior 43. A brush 47 is retained within the limb interior 43. The bush 47 has a flange 48 at one end and is screwed at the other end 49. The peripheral surface 51 of the flange 48 is shaped to correspond with and bears against the tapering projection 44. A nut 52 having a tapering surface 53 is screwed on to the bush 47 so that its tapering surface 53 bears against the corresponding surface 46 of the collar 45. The bush 47 is internally stepped at 54 near the flange and at 55 near its threaded portion 49. The outer races 56 of two taper roller bearings 57 and 58 are retained at these steps 54 and 55. The inner races 59 which surround the pivot shaft 28 are located respectively on a step 61 on the upper surface of a flange 62 at the lower end of the pivot shaft 28 and against a collar 63 screwed on to the upper end 64 of the pivot shaft 28. Above this collar 63, the pivot shaft 28 has keyed thereto a sprocket wheel 65. The upper end of the shorter limb 27 is closed off by a cover plate 66 which is screwed into position. The lower end of the shorter limb 27 is closed off by the pivot shaft flange 62 which is sealed against the limb interior 43 by an O-ring seal 67 carried within a peripheral groove 168. The pivot shaft flange 62 has a number of tapped bolt holes 169 engaged by bolts 170 carrying a hollow supporting member 171. This supporting member carries the ground engaging wheel 31 (see FIGURE 3). Within the supporting member is contained an hydraulic motor 76. The output shaft 172 of the motor 76 carries a sprocket wheel 173 which is drivably connected to a larger sprocket wheel 174 by a chain 175. This sprocket wheel 174 is keyed on to a shaft 176 carrying three further sprocket wheels 177 which drive three sprocket wheels 178 through three chains 179. The sprocket wheels 178 are keyed to the shaft 181 carrying the wheel 31. The sprocket and chain arrangement hereinbefore described provides a 15:1 step down ratio.

Figures 4, 5, 8:
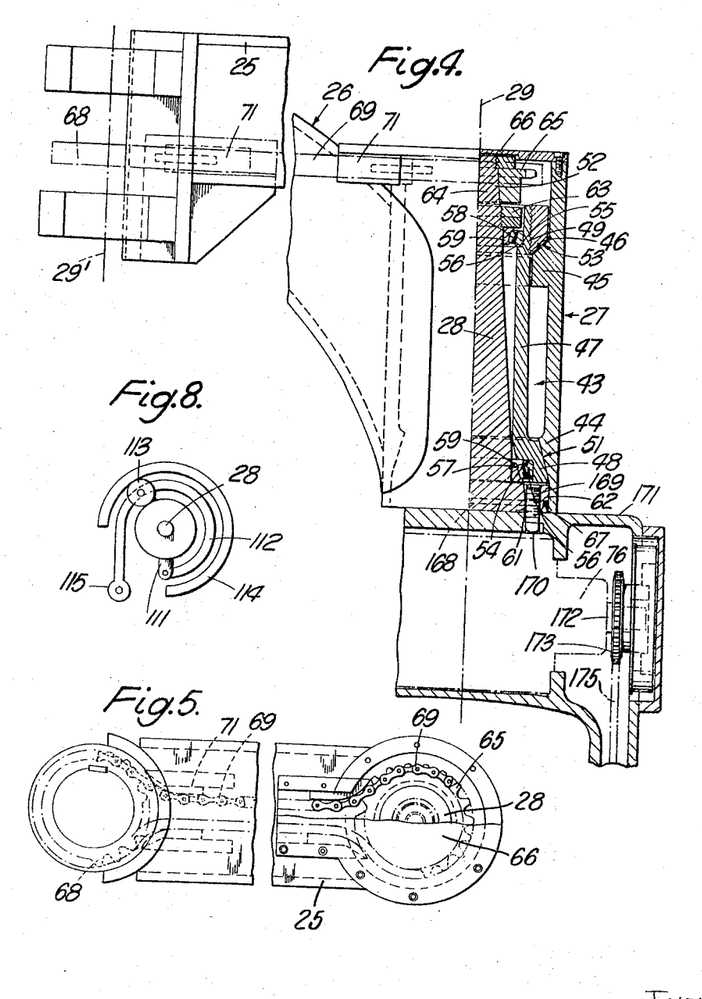
FIGURE 4 is a side view partially in section of a support arm.
FIGURE 5 is a plan of the arm.
FIGURE 8 shows a plan of alternative steering means.

The longer limb 25 of each support arm 26 carries a sprocket wheel 68 which is rotatable about the pivot axis 29′ of the support arm 26 (see FIGURE 5). This sprocket wheel 68 is of the same size as and is connected to the sprocket wheel 65 on the pivot shaft 28 by means of a chain 69 which passes through the hollow limb. A pair of chain guide surfaces 71 are provided adjacent each sprocket wheel 65 and 68 to bring the runs of the chain 69 closer together. A turnbuckle (not shown) is included in one run of the chain 69 to act as a tensioner. It will be noted that this arrangement of sprocket wheels 65 and 68 and chain 69 has the following property: If the driving sprocket wheel 68 is held fixed, the steering angle of the associated ground wheel 31 relative to the longitudinal axis 42 of the tractor will not be affected on pivotal movement of the associated side arm 26 about its pivot axis 29. Thus when the arms 26 are pivoted to effect a track width change, no compensating steering movement is required nor will the tractor be temporarily out of control due to change in steering position of the ground engaging wheels 31.

A pinion 72 is connected to rotate with each driving sprocket wheel 68. A rack 70 engages each pinion 72. The pairs of racks 70 adjacent to the front and the rear support arms 26 are respectively joined by front and rear rigid bars 73. Ball joints 74 connect each bar 73 to the associated racks 70. A pair of steering jacks 75r, 75f are mounted on the body 10 parallel and connected respectively to the bars 73 through lever and ball joints 182. The front and rear steering jacks 75, which each may be a "Jacottet-Leduc" No. 007201 made by Soc. Rene Leduc et fils of Argenteuil, France, act as servomotors to assist steering and move the racks 70 in response to movements of a steering wheel 183 and a steering lever 184 respectively. The steering wheel 183 and lever 184 are located in the driving recess 15 near to the driver's position so that both can be operated by the driver simultaneously to steer the back and front wheels simultaneously.

The steering arrangement is such that each ground engaging wheel 31 may be rotated through 110° on each side of a direction parallel to the longitudinal axis 42 of the tractor. The steering wheel 183 is connected to the front steering jack 75f through a reduction device 183a so that three complete turns of the steering wheel are required to turn the front wheels 31f through 220°. The steering lever 184 is connected to the rear jack 75r through a device 184a so that rotation of the lever through 180° will cause the rear wheel 31r to turn through 220°. Reduction devices 183a and 184a will thus have different reduction ratios to each other.

Figure 7:
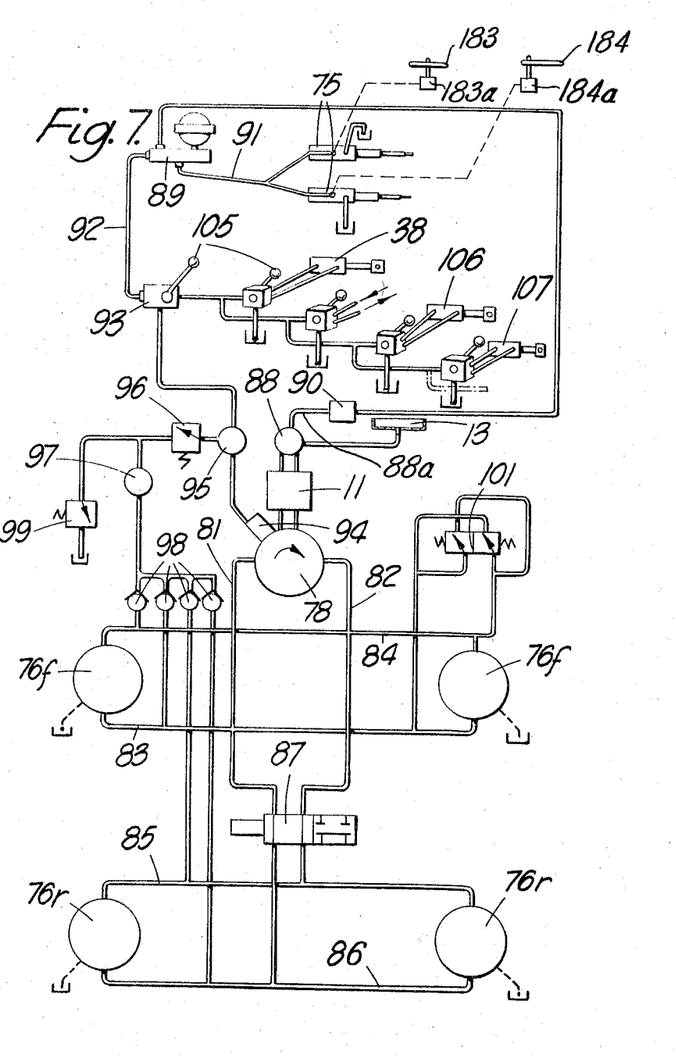
FIGURE 7 shows the hydraulic circuit of the drive mechanism of the tractor.

As described above each ground-engaging wheel 31 is carried by a supporting member 171 and each supporting member also carries a hydraulic motor 76 for driving the ground wheel 31. The hydraulic motors 76 are reversible fixed stroke swashplate motors and operate on a slight leakage to reduce pressure on the seals. The motors 76 are connected to a main hydraulic pump 78 located within the body 10. The hydraulic circuit of the tractor is shown in FIGURE 7. The main hydraulic pump 78, which is a reversible variable stroke swashplate pump, is driven by the tractor diesel engine 11. The main pump 78 is connected to the motors 76 driving the front and rear wheels through main conduits 81 and 82 and subsidiary conduits 83, 84, 85 and 86. A selector valve 87 is connected into the main conduits 81 and 82 to isolate the motors 76r driving the rear ground engaging wheels. As the hydraulic circuitry must operate full, a booster pump 88 also driven by the diesel engine 11 and an accumulator 89 are also provided. This booster pump 88 has its inlet connected to an hydraulic reservoir 13. Its outlet 88a is connected to the main pump 78 through a filter 90 and an accumulator 89. The accumulator 89 has two outlets, one 91 of which is connected to the steering jacks 75 and the other 92 is connected to the other booster and servo circuits. The jack circuit which incorporates the jacks 38 for pivoting the arms 26, the jacks 106 and 107 for moving the three point linkage (hereinafter described) and any subsidiary apparatus is connected to the accumulator through a main off-on valve 93. The outlet from valve 93 is connected via a filter 95 to a servo-motor 94 which is operable to vary the inclination of the plate of the main swashplate pump 78. The filter 95 is also connected through a high pressure (40 kg./cm.$^2$) relief valve 96, a second filter 97 and four non-return valves 98 to the subsidiary conduits. A low pressure (3 kg./cm.$^2$) relief valve 99 is also provided in the booster pump circuit. A safety valve 101 is provided in the circuit of the front wheel motor 76f, subsidiary conduits 83 and 84.

Figure 1:
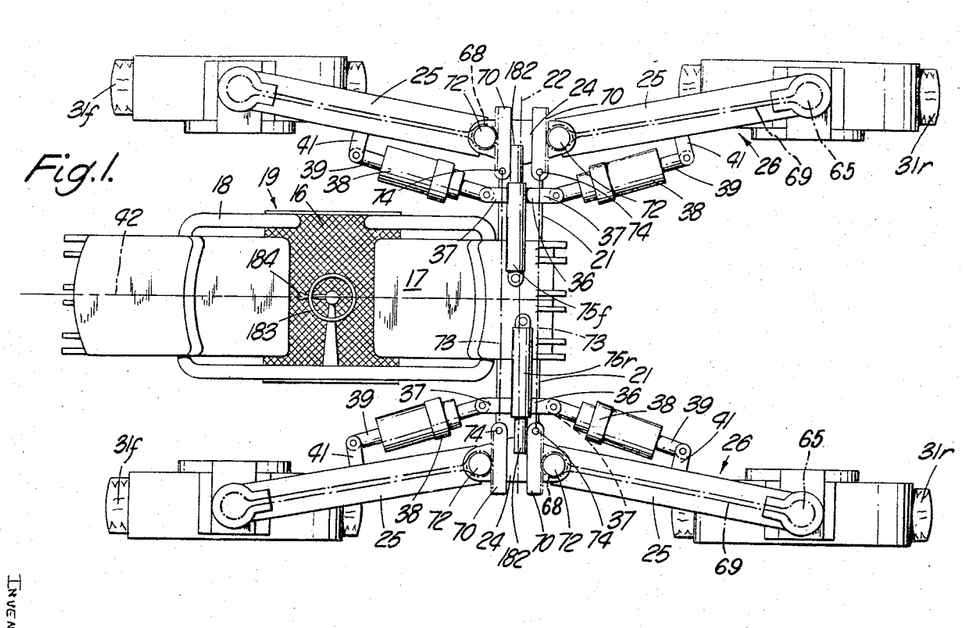
FIGURE 1 is a plan of an agricultural tractor of the invention.
Figure 2:
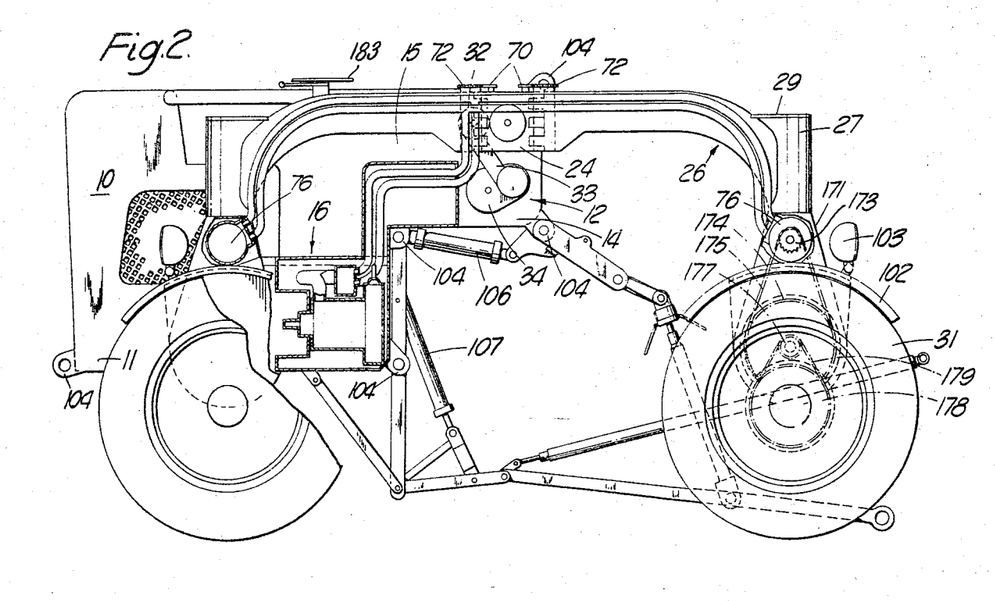
FIGURE 2 is a side view of the tractor partly broken away to show the hydraulic leads and certain other parts not seen in FIGURE 1.
Figure 3:
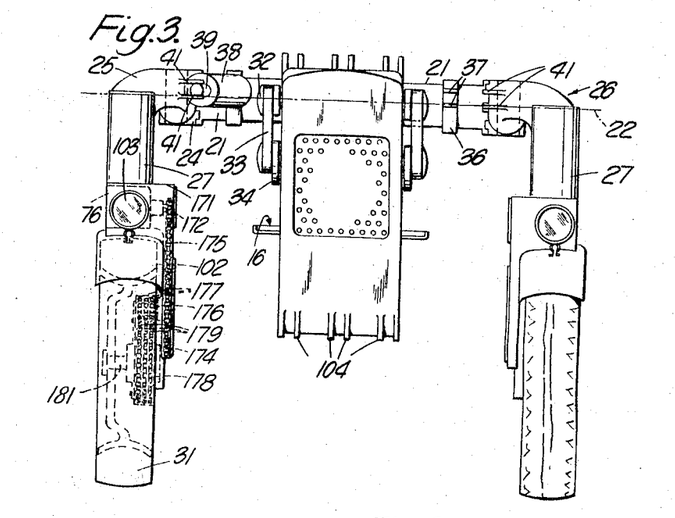
FIGURE 3 is a detail front view of the tractor.

The ground-engaging wheels 31 are provided with mud guards 102 on which are mounted spotlights 103. Lugs 104 are provided at various locations at the front and rear of the tractor body 10 so that agricultural implements, trailers or the like may be connected to the tractor. Jacks 106 and 107 together with the appropriate linkage may be attached to these lugs 104 as shown in FIGURE 2 to provide e.g. a conventional three point linkage. Manually operable levers 105 are provided at any convenient place e.g. at the recess 15 for controlling the various hydraulic actions.

The differential linkage 32, 33, 34 and 35 hereinbefore described enables the tractor to traverse irregular ground and yet maintain all four ground-engaging wheels 31 engaging the ground. Further, in the event of the wheels 31 on one side of the body (e.g. the right hand wheels) being inclined relative to the wheels on the other side (i.e. the left hand wheels) as would happen if one of the right hand wheels rises or falls relative to the other three wheels the body will be caused by the differential linkage to tilt relative to the left hand wheels by only half the inclination of the right hand wheels. This arrangement also obviates the necessity for springs, shock absorbers and the like being used at e.g. the seat to give a satisfactory ride for the driver.

As the motors 76 rotate about the steering axis with the wheels they drive, the wheels can be steered through large angles and transmission difficulties are largely obviated.

As all the wheels 31 can be steered through 110° on either side of the direction parallel to the longitudinal axis 42 of the tractor, the wheels may be so inclined that the tractor travels at or near right angles to its longitudinal axis 42. In this way the tractor can operate comfortably on an incline. Another advantage of this arrangement is that the tractor's turning circle may be made only slightly greater than the distance between front and rear wheels.

By pivoting the supporting arms 26 the track of the tractor may be varied as desired. Further if necessary or desirable the four wheels 31 may run along four separate paths when the tractor is moving. Yet again the quadrilateral defined by the points of contact on the ground of the ground wheels may be varied as desired to suit the particular terrain and to ensure the centre of gravity of the tractor falls in an optimum position in the quadrilateral. The provision of the jacks 38 to cause the arms to pivot enables the arms to be moved when the tractor is moving or when the ground is sufficiently soft when the tractor is stationary.

As the hydraulic motors 76 driving the wheels are reversible the tractor may move forward or rearward as desired. Indeed the terms "front" and "rear" as applied above are merely terms of reference. However when two wheel drive only is being used, it is desirable that the forward wheels are the driven wheels. This minimises the chances of the tractor toppling over backwards when taking up the load.

The invention is not limited to the precise constructional details herein described.

For example instead of the chain and sprocket steering arrangement the pivot shaft 28 may be rotated by the device shown in FIGURE 8. This device comprises a cam arm 111 rotatable with the pivot shaft 28. The cam arm 111 is pivotally connected to an arcuate member 112 which carries a roller 113 intermediate its length. The roller 113 runs between the outside surface of the pivot shaft 28 and the inner surface of an arcuate guide wall 114. Its free end 115 is pivotally connected to the steering gear.

Figure 6:
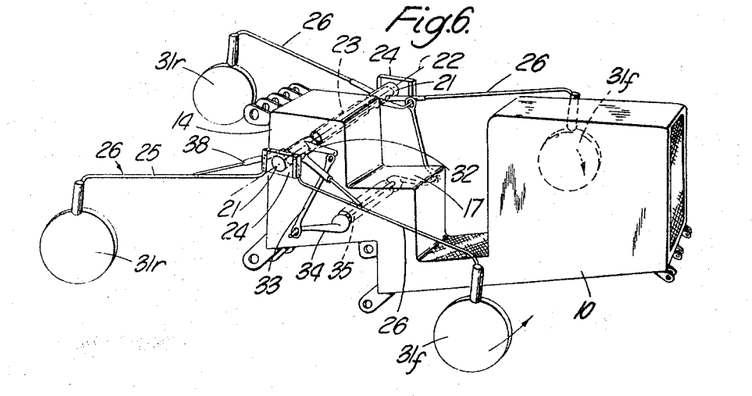
FIGURE 6 is a diagrammatic perspective detail view showing the differential linkage.
Figures 9, 10, 11, 12:
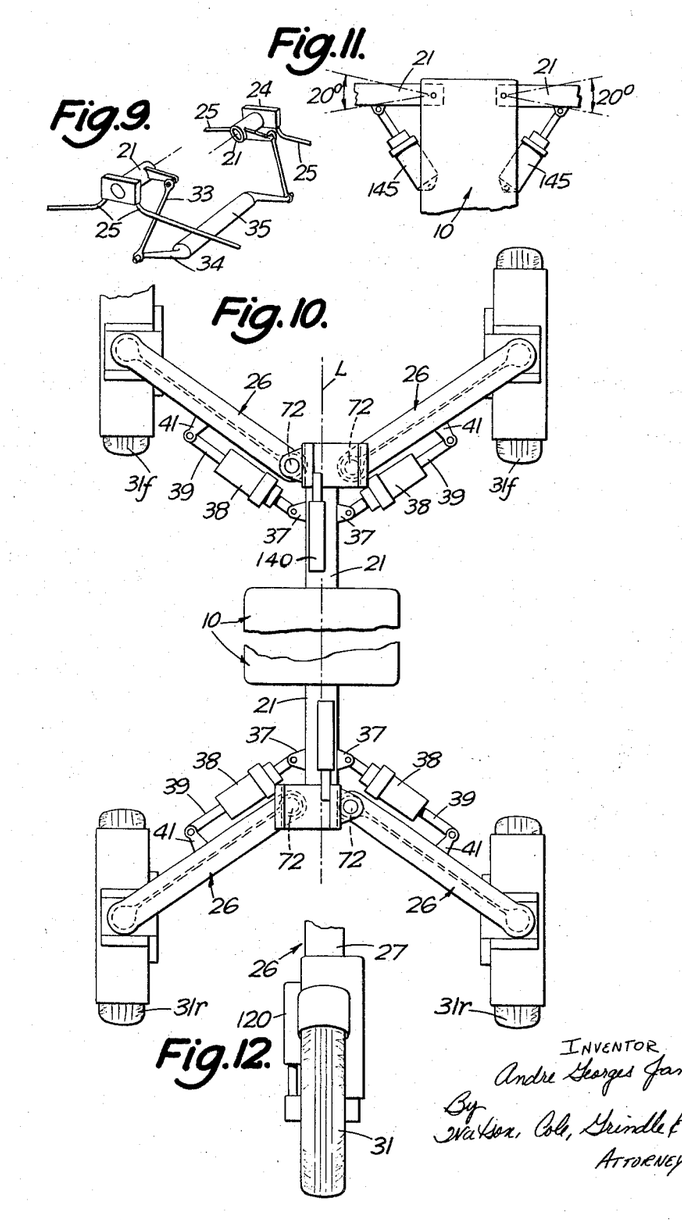
FIGURES 9 to 17 are diagrammatic drawings illustrating various other modifications.

Further, as indicated in FIGURE 9, which shows a fragmentary modification of FIGURE 6, the bridge shafts need not be coaxial. As indicated in FIGURE 10, the tractor may be so arranged that the bridge shaft axis/axes lies/lie in the longitudinal plane L of the body. Also, by means of a jack 140 operating in the same manner as jacks 75, only one pair of ground engaging wheels, the front wheels in this case, are steered.

Further the arms may be pivotable by jacks 145 about an angle up to the 20° to the vertical, as indicated in FIGURE 11. It will be seen that by tilting the axes about which the arms pivot, the position of the wheels relative to the body may be varied so that e.g. the left hand wheels may be located below the right hand wheels and the transverse plane of the tractor may be maintained horizontal when the tractor is on incline. Another way, illustrated in FIGURE 12, of obtaining this result is to mount the pivot axes of the wheels in slides and by means of jacking or similar devices 120 move the wheels up and down relative to the shorter limbs 27 of the L-shaped support arms 26.

Figure 13:
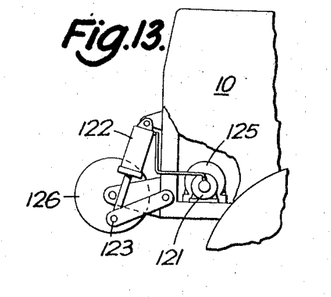
Figure 14:
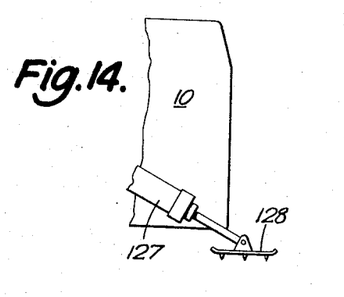

Yet again, as illustrated in FIGURE 13, one or more additional pumps 121 may be provided and these may drive e.g. jacks 122 to a movable draw bar 123. Motors 125 may be provided for additional tools e.g. ditch digging machinery etc. in general public works, mines, maintenance or all other applications mentioned before, or a winch 126 which for example may be utilised as a self recovering device. Referring now to FIGURE 14, a pair of jacks 127 may be provided at the rear of the tractor, which jacks are provided with pushing feet 128. These feet can be placed against the earth and expanded to push the tractor through e.g. muddy ground or when a large thrust is required e.g. to push a bulldozer blade.

Figures 15, 16, 17:
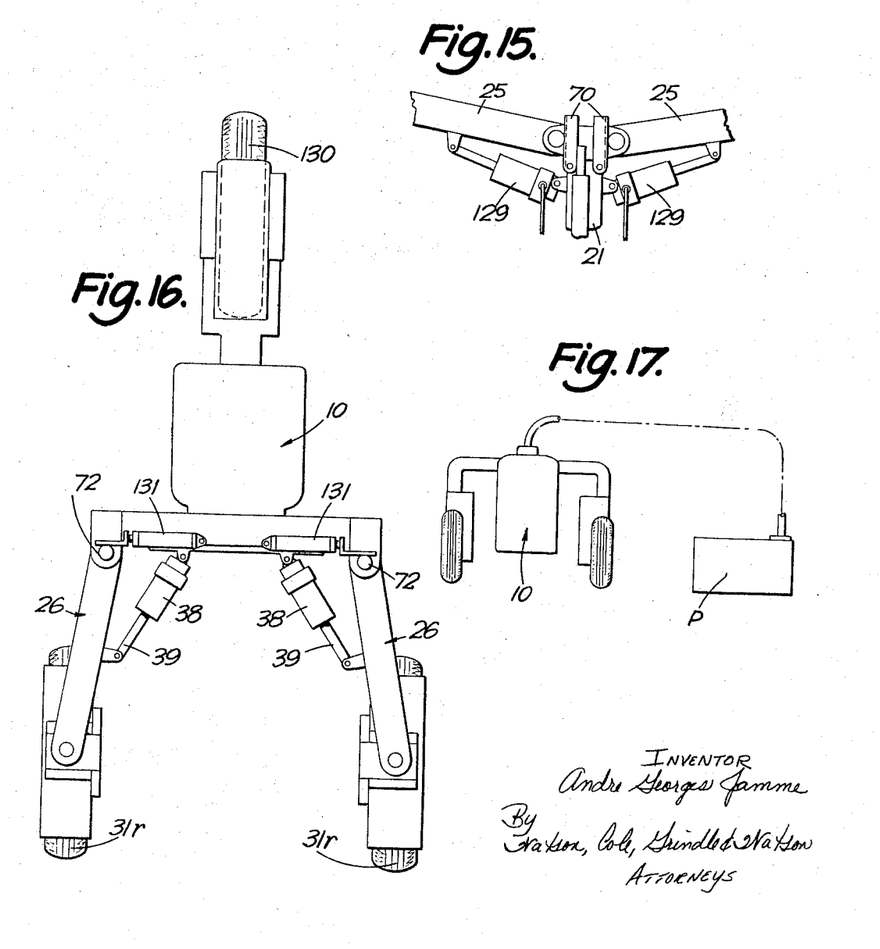

Furthermore, as illustrated in FIGURE 15, other mechanical means 129 such as a rack and pinion or a screw device may be provided to pivot the arms 25.

In the modification illustrated in FIGURE 16, the vehicle has only three ground-engaging means. A single front ground-engaging means 130 is provided in the longitudinal plane of the vehicle. The two rear ground-engaging means 31r are carried respectively on two arms 26 which are pivoted relative to the tractor body and movable by jacks 131 in the manner previously described.

If necessary or desirable the vehicle although embodying the drive means as above described may, as illustrated in FIGURE 17, have the prime mover and/or power source P separate therefrom and carried on another vehicle or fixed location. The main power source is then connected to the drive means through suitable hydraulic or pneumatic connections.

The hydraulic circuit may at the drive motors incorporate connectors as described in U.S. patent application Serial No. 353,893.

I claim:
1. A vehicle comprising a body, a pair of members mounted in spaced relation to each other on opposite sides of the body for swivelling movement about a common horizontal axis, a pair of radial arms respectively mounted on the two members for rotary movement about upright axes, ground-engaging means mounted on the outer ends of the respective arms, means connected to the respective arms for adjusting the positions of the arms relative to the body about said upright axes, and differential means interconnecting the members so that swivelling movement of either of the members about said horizontal axis relative to the body causes swivelling of the other member in the opposite direction about said horizontal axis.

2. A vehicle as claimed in claim 1, wherein the differential means comprises a pair of cranks fixed to the respective members, a horizontal shaft mounted parallel to said horizontal axis of the members, which shaft carries oppositely-projecting crank arms, and a pair of links interconnecting the two cranks with the respective crank arms.

3. A vehicle as claimed in claim 1, wherein a second arm extends generally radially outward in the opposite direction to the first said arm on each of said members and carries ground-engaging means, said second arms being mounted for pivotal movement about respective upright axes on the respective members, and means being provided for adjusting the positions of said second arms about their upright axes relative to the body.

4. A vehicle as claimed in claim 3, wherein said horizontal axis extends parallel to the fore and aft axis of the body.

5. A vehicle as claimed in claim 3, wherein said horizontal axis extends at right angles to the fore and aft axis of the body.

6. A vehicle as claimed in claim 3, comprising means for controlling the adjusting means for the four arms independently of each other.

7. A vehicle as claimed in claim 3, wherein the ground-engaging means are steerable on the arms, and means is provided for maintaining the direction in which the ground-engaging means point relative to the body unaltered by swivelling movements of the arms about the respective upright axes of the arms.

8. A vehicle as claimed in claim 3, further comprising hydraulic motors mounted on at least two of the arms and connected to drive the ground-engaging wheels carried by those arms, and a hydraulic pump mounted on the body and connected to supply pressure fluid to the hydraulic motors to drive the motors.

9. A vehicle as claimed in claim 3, wherein the ground engaging means are steerable on the arms and wherein there is further provided two steering means connected respectively to a front pair and a rear pair of ground-engaging means and including means mounted on the respective members for rotary movement about said upright axes for transmitting steering movement from said steering means to said ground-engaging means, the said steering means respectively incorporating a pair of manually operable steering members located adjacent each other so as to be capable of simultaneous operation by a driver of the vehicle.

10. A vehicle as claimed in claim 9, wherein the steering means incorporate respectively first and second reduction drives connected between the steering members and the ground engaging means.

11. A vehicle as claimed in claim 10, wherein the first and second reduction drives are of different ratios to each other.

12. A vehicle comprising a body, horizontal bridge shafts extending from opposite sides of the body, side pieces mounted at the free ends of the respective bridge shafts for swivelling movement relative to the body about a common horizontal axis, a pair of arms carried by each side piece, the arms being pivotable relative to the side pieces about upright axes disposed respectively at opposite sides of the horizontal axis of the side pieces, means for adjusting the positions of the arms relative to the body about said upright axes, differential means interconnecting the side pieces so that swivelling of either side piece about said horizontal axis relative to the body causes swivelling of the other side piece in the opposite direction about said horizontal axis relative to the body, and four steerable ground-engaging wheels carried at the free ends of the respective arms, to pivot relative to the arms about steering axes.

13. A vehicle as claimed in claim 12, further comprising a driven sprocket wheel connected to each wheel to rotate therewith about the steering axis of the wheel, four steering control drive sprocket wheels of the same size as the driven sprocket wheels, rotatably carried on the body to rotate about said upright axes of the respective arms, chains drivably connecting the drive and driven sprocket wheel associated with each arm, and steering means operable to rotate each drive sprocket wheel.

14. A vehicle as claimed in claim 13, wherein the steering means for rotating the drive sprocket wheels for the foremost ground-engaging wheels are connected for simultaneous operation and the steering means for rotating the other drive sprocket wheels are also connected together for simultaneous operation.

15. A vehicle comprising a body, a pair of members mounted in spaced relation to each other on opposite sides of the body for swivelling movement about respective horizontal axes extending transversely to the body, a pair of radial arms respectively mounted on the two members for rotary movement about upright axes, ground-engaging means mounted on the outer ends of the respective arms, means connected to the respective arms for adjusting the positions of the arms relative to the body about said upright axes, and differential means interconnecting the members so that swivelling movement of either of the members about its said horizontal axis relative to the body causes swivelling of the other member in the opposite direction about its said horizontal axis.

References Cited by the Examiner

UNITED STATES PATENTS

| | | | |
|---|---|---|---|
| 1,302,489 | 4/1919 | Hollis | 280—34 X |
| 1,577,559 | 3/1926 | Budd | 280—91 |
| 2,317,623 | 4/1943 | Lee | 180—46 |
| 2,334,980 | 11/1943 | Allen | 180—46 |
| 2,351,830 | 6/1944 | Mitchell et al. | |
| 2,610,073 | 9/1952 | Lilly | 280—104 |
| 2,783,849 | 3/1957 | Armington et al. | 180—79.2 |
| 2,904,341 | 9/1959 | Heitshu | 280—6.11 |
| 3,147,990 | 9/1964 | Wettstein | 280—104 |

FOREIGN PATENTS

| | | |
|---|---|---|
| 730,164 | 5/1932 | France. |
| 767,420 | 2/1957 | Great Britain. |

A. HARRY LEVY, *Primary Examiner.*